US009069615B2

(12) United States Patent
Hackborn et al.

(10) Patent No.: US 9,069,615 B2
(45) Date of Patent: Jun. 30, 2015

(54) APPLICATION MANAGEMENT

(71) Applicant: Google Inc., Mountain View, CA (US)

(72) Inventors: Dianne K. Hackborn, Mountain View, CA (US); Arve Hjonnevag, Sunnyvale, CA (US); Joseph M. Onorato, Cmabridge, MA (US); Brian J. Swetland, Mountain View, CA (US)

(73) Assignee: Google Inc., Mountain View, CA (US)

(*) Notice: Subject to any disclaimer, the term of this patent is extended or adjusted under 35 U.S.C. 154(b) by 32 days.

(21) Appl. No.: 13/964,559

(22) Filed: Aug. 12, 2013

(65) Prior Publication Data
US 2013/0332940 A1 Dec. 12, 2013

Related U.S. Application Data

(63) Continuation of application No. 11/932,613, filed on Oct. 31, 2007, now Pat. No. 8,510,743.

(51) Int. Cl.
*G06F 9/50* (2006.01)
*G06F 3/048* (2013.01)
*G06F 11/14* (2006.01)
*G06F 9/46* (2006.01)
*G06F 3/0481* (2013.01)
*G06F 9/48* (2006.01)

(52) U.S. Cl.
CPC .......... *G06F 9/5022* (2013.01); *G06F 11/1402* (2013.01); *G06F 3/0481* (2013.01); *G06F 9/461* (2013.01); *G06F 9/485* (2013.01); *G06F 9/5016* (2013.01); *G06F 11/1438* (2013.01)

(58) Field of Classification Search
None
See application file for complete search history.

(56) References Cited

U.S. PATENT DOCUMENTS

| 6,850,257 | B1 | 2/2005 | Colleran et al. |
| 6,938,254 | B1 | 8/2005 | Mathur et al. |
| 7,237,240 | B1 | 6/2007 | Chen et al. |
| 7,503,044 | B2 | 3/2009 | Chew |
| 7,512,952 | B1 | 3/2009 | Liu et al. |
| 2004/0139284 | A1 | 7/2004 | Clayton et al. |
| 2005/0021917 | A1 | 1/2005 | Mathur et al. |
| 2005/0034129 | A1 | 2/2005 | Chew |
| 2005/0235094 | A1 | 10/2005 | Sawada |
| 2006/0085787 | A1 | 4/2006 | Breslaw |
| 2007/0162779 | A1 | 7/2007 | Downer et al. |
| 2009/0037780 | A1 | 2/2009 | Nakagaki et al. |
| 2010/0112955 | A1 | 5/2010 | Krishnaswamy et al. |

OTHER PUBLICATIONS

International Search Report & Written Opinion for Application No. PCT/US2008/082094, dated Jun. 1, 2009, 11 pages.
International Preliminary Report on Patentability for Application No. PCT/US2008/082094, dated May 4, 2010, 10 pages.
Supplementary European Search Report for Application No. EP 08845408.7-2211, dated Jun. 4, 2012, 3 pages.
Office Action issued in European Application No. 08845408.7 on Oct. 8, 2014, 6 pages.

*Primary Examiner* — Qing Wu
(74) *Attorney, Agent, or Firm* — Fish & Richardson P.C.

(57) ABSTRACT

The subject matter of this specification can be embodied in, among other things, a method that includes executing one or more computer applications and ranking the applications according to one or more criteria that change in response to a user's interaction with the applications. State information for certain of the one or more applications is saved and one or more applications are terminated in response to a memory condition. Subsequently, one of the terminated applications is revived using the saved state information.

19 Claims, 10 Drawing Sheets

APPLICATION MANAGEMENT

CROSS-REFERENCE TO RELATED APPLICATIONS

This application is a continuation application of and claims priority to U.S. application Ser. No. 11/932,613 (now U.S. Pat. No. 8,510,743), filed on Oct. 31, 2007, the entire contents of which are hereby incorporated by reference.

TECHNICAL FIELD

This document refers to management of applications running on a computing device when memory is limited.

BACKGROUND

Computers continue to expand outward from their origins in temperature-controlled data centers, to room-size mainframes, to desktop personal computers, to laptops, and on to portable devices such as personal digital assistants (PDAs) and smartphones. The ever-decreasing size of computers creates a challenge for computer designers and for software developers seeking to develop operating systems for the computers and programs to run on the computers. Even as the size of the devices shrink, the demands of computer users have increased, so that people expect their cellular telephones to play audio and video, and to carry out all sorts of additional functions—often at the same time.

Each such application requires computer memory to run however, the smaller a device is, the less memory it typically can have. Thus, a computer may run out of memory when it is executing multiple applications simultaneously. Such a memory overflow condition can sometimes cause the computer to crash. Memory management techniques commonly employed by desktop computers, laptops, and the like are generally unsuitable for their less powerful portable counterparts. For example, the virtual memory management systems commonly used in a desktop computing system require numerous read and write operations from and to the system's hard drive. Portable devices often rely on flash memory that is ill-suited for frequent write operations and is often too small for use in a virtual memory management system. Desktop computing systems may also rely on the user to manage applications running the system; e.g., the user often closes unnecessary applications or applications that consume too much memory. However, user memory management is often undesirable for portable computing devices. The exemplary systems and methods manage memory on portable computing devices without using virtual memory or requiring the user to participate in memory management. Memory management in the exemplary systems is often transparent to the user because, in some implementations, every application may appear to be running, when, in fact, one or more of the applications may have been terminated. In an illustrative example, the operating system may close one or more applications when memory is needed. If a user wants to interact with a terminated application, the operating system may revive the application using saved state information.

SUMMARY

In general, this document describes systems and techniques for managing applications on a computing device, such as a mobile telephone, when memory runs out. The systems and techniques may monitor memory usage on a device and when memory runs out, or, in some implementations, begins to run low, the system kernel may identify applications that are of lesser importance to the user. Various state parameters for such applications may be saved, where the state parameters are selected to be sufficient to recreate the current state of the application. The system kernel may then shut down the selected application or applications to free up memory. Later, applications that were shut down may be re-launched, often in a manner that is transparent to the user.

In certain implementations, the applications to be shut down may be selected as applications that closely match the memory that is required, or expected to be required, by a dominating application. In addition, the applications to be shut down may be based on the application type (e.g, applications that do not respond to periodic outside communications can be shut down before applications that do), application visibility, or based on frequency of use by the user (e.g., as determined by the elapsed time since the user last focused on the application or on the number of times (or the amount of time) the user has focused on the application over a prior time period).

One implementation provides a computer-implemented method for managing computer applications. The computer-implemented method includes steps that, when performed, execute one or more computer applications. The method may also include steps that rank the applications according to one or more criteria that change in response to a user's interaction with the applications and save state information for certain of the one or more applications. The computer-implemented method may also include steps to terminate one or more applications in response to a memory condition and subsequently revive one of the terminated applications using the saved state information.

In a second general aspect, a computer-implemented system for managing computer applications includes an application manager to classify applications according to one or more criteria that change in response to a user's interaction with the applications and to save state information for certain of one or more applications. The system may also include an application terminator to terminate one or more applications upon the occurrence of a memory shortage and a kernel to, in response to user interaction with the one or more applications, revive a terminated application using the saved state information when the terminated application has the highest application ranking.

In a third general aspect, the computer implemented system includes computer memory to store a plurality of simultaneously-operating computer applications. The system may also include an application manager; and means for temporarily terminating and re-launching applications in response to a computer memory condition The systems and techniques described here may provide one or more of the following advantages. First, a system can run multiple applications on a computing device with limited memory without requiring fixed constraints on memory usage or using virtual memory. Additionally, the system may provide the user with a substantially uninterrupted computing experience while providing transparent memory management.

The details of one or more embodiments are set forth in the accompanying drawings and the description below. Other features and advantages of those features will be apparent from the description, drawings, and the claims. The details of one or more embodiments of the features are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for managing memory on a computing device with limited memory. In an exemplary implementation, applications running on the system are ranked, and low ranking applications are killed if the device's memory is unable to accommodate current memory demands. A killed application may be subsequently revived by the system if a user attempts to interact with the killed application. For example, it is increasingly common today for cellular telephone users to run multiple programs at the same time on their telephone. One or more applications may lie dormant in the background of the telephone's display as the user interacts with another application in the telephone's foreground. If the telephone runs out of memory, the telephone's operating system may kill one or more background applications to ensure that enough memory is available for use by the foreground application. When the user attempts to return to the terminated background application, the system may recreate the application as it existed before it was killed using information saved by the application. In an alternative implementation, the telephone's operating system may detect a pending memory shortage and, in response, terminate one or more applications to provide sufficient memory for important applications. If the user tries to use a terminated application, the application is recreated using data saved by the application before it was killed.

Figure 1:
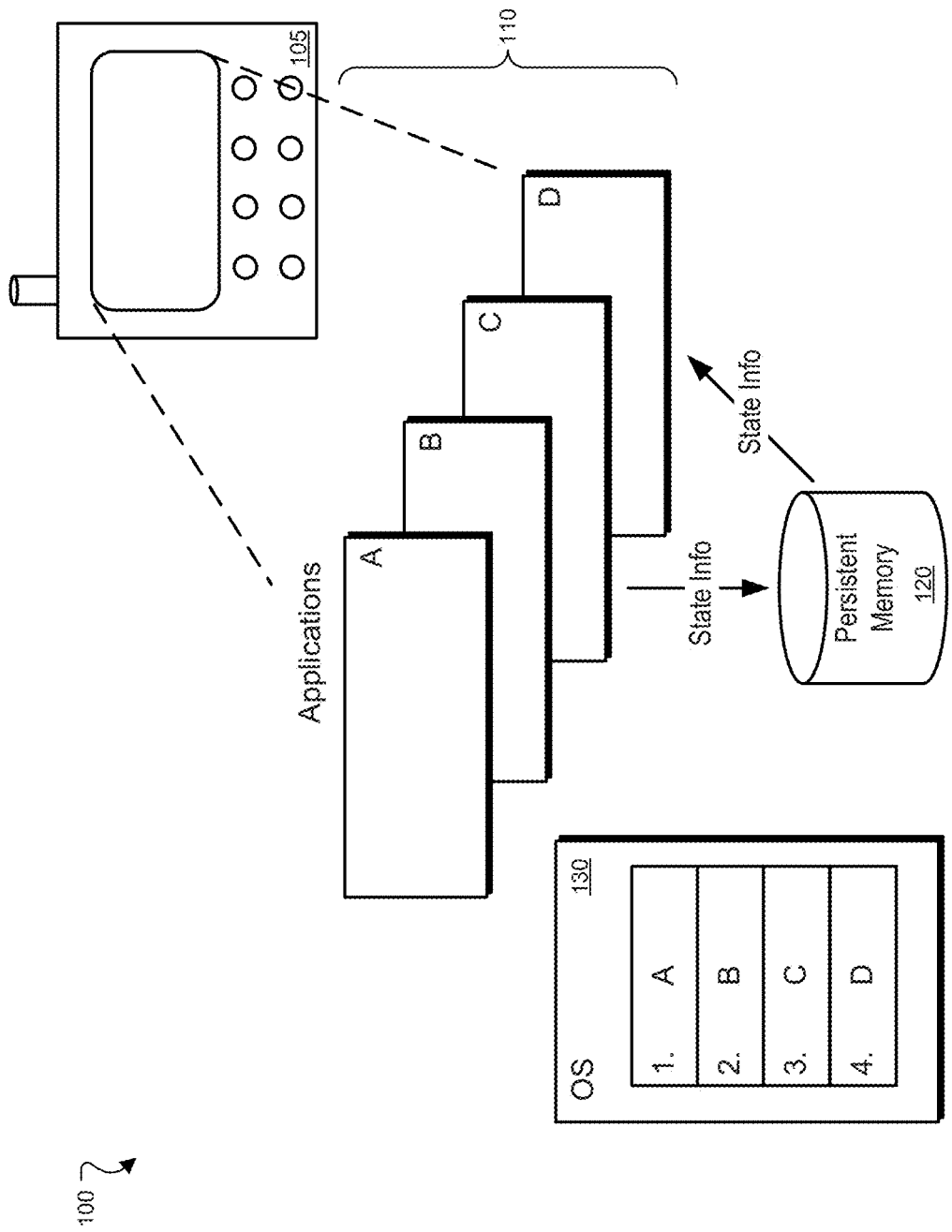
FIG. 1 is a schematic diagram illustrating an exemplary memory management system for managing memory shortages on a computing device.

FIG. 1 is a schematic diagram illustrating an exemplary memory management system 100 for managing memory shortages on a computing device 105. The illustrative system 100 may include an operating system 130 that controls the execution of software applications 110 on the device 105. In one implementation, the device 105 may be a cellular telephone containing an operating system 130 capable of executing several software applications simultaneously. In alternative implementations, the computing device 105 may be a laptop, personal computer, personal digital assistant, or other appropriate computing device.

In one implementation where the device 105 is a telephone, after turning on the telephone, the telephone's operating system 130 may be loaded from persistent memory 120 and may present a graphical user interface containing a predetermined display of icons to the user. Each icon can be either an application or a proxy for an application available to the user; when selected, a chosen icon may, if necessary, pass the associated application's parameters and file location in memory to the operating system 130, which, in turn, can execute the application 110. Each executed application uses a segment of the telephone's persistent memory 120; as an application continues to run, its memory requirements may increase. As the user executes more applications 110, or the running applications 110 consume additional memory, the telephone's memory 120 may eventually become inadequate to accommodate the memory demands of the applications 110.

In an exemplary implementation, the memory management system 100 may respond to memory shortages by terminating one or more applications 110 when persistent memory 120 has been exhausted and reviving the terminated application when the user returns to the application. In certain implementations, because the terminated application window may be either fully or partially obscured by another application window, the user may not be aware that the application has been terminated. When a user chooses to switch back to the application, the application may be re-launched and the user may not know that the application was temporarily terminated aside from perhaps a sluggish response in displaying the application.

In an illustrative implementation, the operating system 130 can rank the applications 110 according to a user's interactions with the graphical user interface, and each application 110 may generate and save information regarding its current state in response to a signal from the operating system. The applications may save such state information themselves or may provide the information to the operating system 130, which may in turn save the information to persistent storage (e.g., flash memory).

If memory 120 is exhausted, the operating system 130 may terminate one or more ranked applications 110 and later recreate the terminated applications in response to a user request. For example, once the operating system 130 has loaded, the user may select a document viewing application to read a stored document. Subsequently, while the document viewer is still running, the user may open a web browser and begin surfing the Internet. In the midst of the web browsing session, the user, in response to a notification that an email has arrived, may select the telephone's email application to review the new email. As the user is reading the email, the user may attempt to run a calendar application to create a reminder for an event mentioned in the email.

In an exemplary implementation, as the user opens new applications, the operating system 130 may rank the applications 110 according to one or more dynamic criteria. Here, the operating system 130 might rank the running applications 110, in descending order of importance, in the following manner: email application, web browser, and document viewer. Such ordering may occur in various ways. For example, the applications may be separated into various categories, such as necessary business applications, entertainment applications, etc. In some implementations, the operating system 130 may recognize that a particular application lays dormant when it is in the background, so it may classify that application as low priority. But another application may be constantly accessing information over a network (e.g., a messaging program) and may thus be ranked as a higher priority application. In some implementations, applications are divided into two categories: visible and invisible applications. Invisible applications (i.e., those applications whose windows are not visible to the user) are ranked lower than visible applications. In an alternative implementation, the developers of the applications may self-classify the applications or the user may classify or otherwise rank the applications, and such classifications or rankings may be provided to the operating system 130.

As the user interacts with the applications 110, each application may generate and save information regarding the current state of the application. For example, when an application enters a state where it could be killed by the operating system 130 at any time (e.g., the application is no longer visible to the user) the operating system 130 may instruct the application to save its current state.

Returning to the illustrative example, because the telephone's memory 120 might be insufficient to run all four applications at once, the operating system 130 may choose to terminate the lowest ranked application (in this example, the document viewer) as it opens the calendar application because it has run out of memory. In an alternative implementation, the operating system 130 may predict a pending memory shortage and terminate one or more applications to prevent memory from running out. For example, if the amount of memory currently available drops below a predetermined threshold, the operating system may kill low ranking applications to bring the amount of currently available memory above the threshold. In an alternative implementation, the operating system 130 may compare upcoming memory requests by applications 110 with the amount of memory currently available; if the amount requested exceeds the amount currently available, the operating system may kill one or more applications.

In such a situation, the operating system 130 may identify the lowest ranked application or applications and terminate them temporarily. The operating system 130 may also set a flag as an indication of applications that may need to be re-launched automatically at a later time, e.g., when memory frees up.

Selection of an application to kill may occur by other techniques. For instance, the operating system 130 may determine the amount of memory that is needed by a particular application and then identify other operating applications that can free up that amount of memory plus a certain safety zone of overhead memory. As one example, an application might require 3000K of extra memory and three other applications might each be capable of freeing up 2000K, 3000K, and 15000K of memory, respectively. The operating system 130 may determine that the least "damage" to memory, or the best use of available memory, may be accomplished by killing the first two programs because they most closely approximate the amount of memory that is needed. Alternatively, the operating system may be programmed to prefer killing as few applications as possible. In such a situation, the third application in the example would be killed.

Once the user has finished using the calendar application, the user may choose to return to the document viewing application. When the operating system 130 detects an attempt by the user to return to the document viewing application, which has been killed temporarily, the operating system 130 may recreate the application using the saved state information.

To do so, the operating system 130 may first sense a command to access the document viewing application, and may note from the stored flag that such application was active but has been killed temporarily. The operating system 130 may then launch the application and pass the saved state information to the application so that the application may be recreated in the form it was in, or substantially the form it was in, when it was temporarily killed. Alternatively, the application may have stored its own state information in cooperation with the operating system, and may itself access and implement such information.

Figure 2:
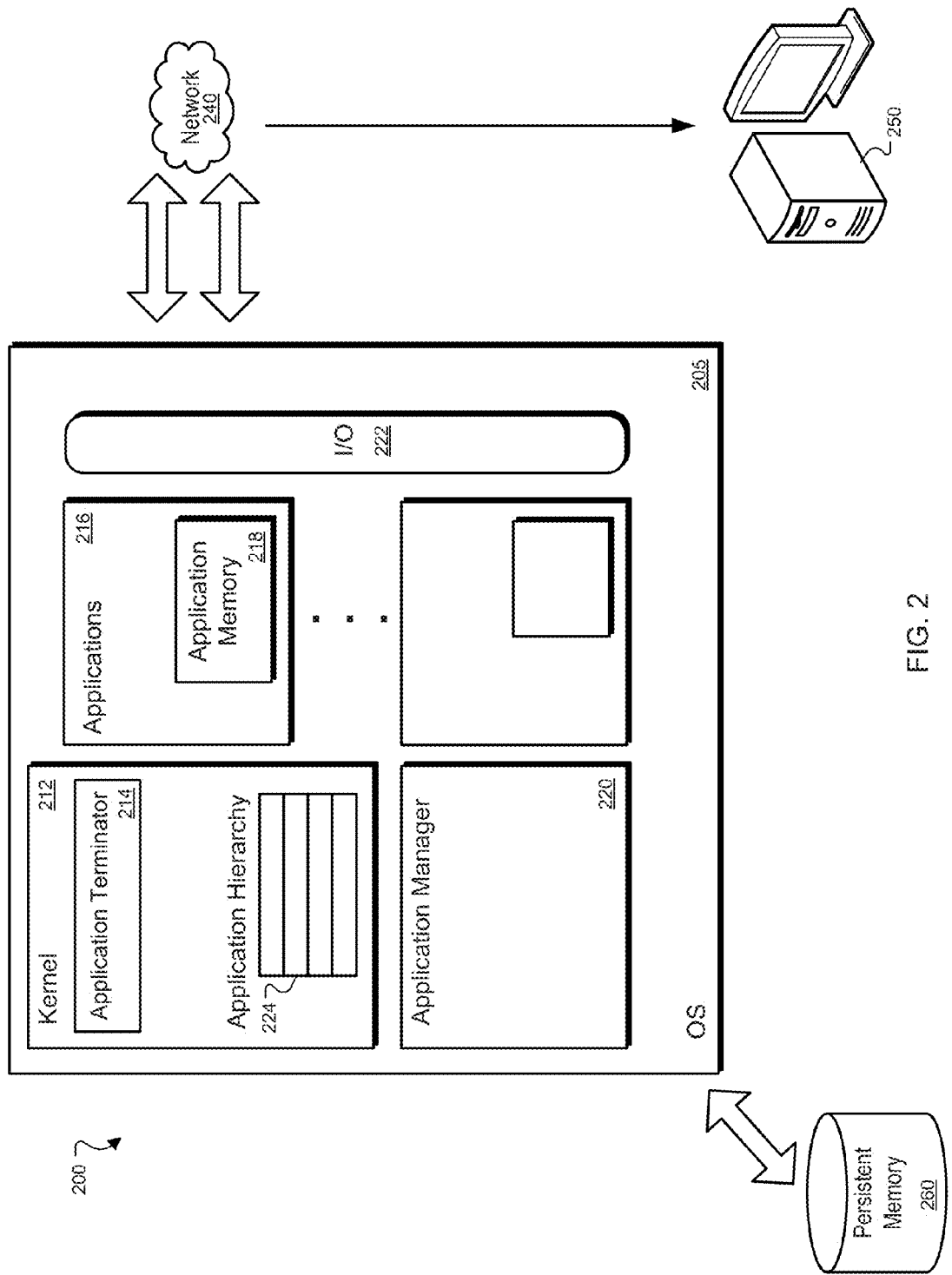
FIG. 2 is a block diagram of an exemplary memory management system for managing memory shortages on a computing device.

FIG. 2 is a block diagram of an exemplary memory management system 200 for managing memory shortages on a computing device. The system 200 can include an operating system 205 that, in turn, includes a kernel 212. In some implementations, the kernel 212 may contain an application terminator 214 and an application hierarchy 224. The operating system 205 may have access to persistent memory 260, an I/O interface 222, and an application manager 220. The operating system 205 may be capable of running one or more applications 216, where, in an exemplary implementation, each application has application memory 218 for storing data relating to the application. In some implementations, the system 200 may communicate with a remote computing device 250 using a network 240, such as the Internet.

As described in greater detail below, the operating system 205 can control the execution of various applications 216 running on the system 200. By, among other things, scheduling when applications may execute instructions on the computing device's processor (not shown), the operating system 205 may prevent the applications 216 from causing critical system errors, such as memory overflow errors.

In an illustrative implementation, a kernel 212 can be included in the operating system 205. The kernel 212 may be responsible for directing core operating system applications such as controlling process execution, managing memory, and handling device drivers, among many others. In certain implementations, the kernel 212 may rank applications in an application hierarchy 224 according to when an application's associated window was in the foreground of the display and able to receive user input, i.e., when the window was in focus. In an alternative implementation, the kernel 212 may rank applications according to other criteria. For example, applications may be ranked according to memory or processor usage, the amount of time the application has been running, or the visibility of the application window, and other factors discussed herein.

The application hierarchy 224 may be implemented, for example, as a program stack. In certain implementations, applications 216 are ranked in descending order beginning at the top of the stack. Because, in some implementations, the application that is currently in focus is placed on the top of the stack, the stack can represent a ranking of active applications by when they were in focus or by another parameter.

Application manager 220 may, in certain implementations, monitor applications 216 running on the system. In some implementations, when an application's state changes, application manager 220 may instruct the kernel 212 to update the application hierarchy 224. As the state of the applications 216 change, the application manager 220 may also direct each application to save the application's current state to persistent memory 260.

In an alternative implementation, the saved state information may include dependencies between applications. For example, at times a user may execute an application that relies on information produced by other applications. In an illustrative example, a user may execute both a media player and a web browser. As the media player is playing music stored on the computing device, the name of the artist, song, and other information related to the currently playing track may be displayed in the status bar of the web browser. When the web browser is instructed to save state information, it may include information relating to the media player that would allow the browser to continue displaying song information when the browser is revived. For instance, the state information may include the media player's program identifier and operating parameters.

The kernel 212 may include an application terminator 214. The application terminator 214 may, in response to receiving an appropriate command from the kernel 212, erase one or more applications 216 from memory 260. The application terminator 214, in an alternative implementation, may be part of a unified system cache (not shown). In some implementations, the application terminator 214 may kill an application while leaving a "snapshot" of the application window visible in the graphical user interface. For example, if the application window of the application to be terminated is partially visible in the background of the graphical user interface, before the application is killed by the application terminator 214, the terminator 214 may copy the application window. After killing the application, the operating system 205 may display the copy of the application window in the graphical user interface. By displaying the copy of terminated application window, the operating system 205 may prevent the user from realizing that a background application has been killed.

In an alternative implementation, either the application manager 220 or the application terminator 214 may generate and update the application hierarchy 224. For example, as applications 216 change state, the appropriate entity may update the application hierarchy 224. When the system 200 runs out of memory or, in an alternative implementation, detects an impending memory shortage, information identifying applications 216 at the bottom of the hierarchy 224 can be passed from the proper entity to the kernel 212, if necessary.

Referring to FIG. 2, in certain implementations, as one or more applications 216 are executed on a graphical user interface, the application manager 220 may observe the running applications 216 and, as a user interacts with the applications 216, may inform the kernel 212 when an application changes state. For example, when the operating system 205 is loaded from memory, the operating system 205 may run the application manager 220 during the operating system's 205 start-up routine. In an illustrative example, as a user interacts with the graphical user interface, the application manager 220 may instruct the kernel 212 to update the application hierarchy 224 as applications 216 gain and lose focus. For example, when the application manager 220 reports that an application's window is no longer in the foreground of the display, the application terminator 214 can downgrade that application in the hierarchy 224.

In an illustrative implementation, when an application's state changes, the application manager 220 may order the application to save the application's current state to memory 260. In some implementations, before an application saves state information to persistent memory 260, the application may save state information to the application's memory 218. For example, when an application's window moves to the background of the telephone's display or is no longer visible, the application manager 220 may instruct the application to save any information necessary to later recreate the application. In response, the application may first temporarily save the state information to application memory 218; when the appropriate function is called, the application may then save the recorded state information to persistent memory 260.

As an increasing number of applications 216 are executed, or the existing applications 216 use more memory, the operating system 205 may terminate one or more applications 216. For example, when the system 200 has run out of memory, the kernel 212 may kill one or more applications so that there is sufficient memory to execute important (i.e., highly ranked) applications. In some implementations, the kernel 212 may detect that no memory 260 is available and, in response, notify the application terminator 214 to kill one or more low ranked applications. In an alternative implementation, the kernel 212 may detect an imminent memory shortage. When an impending memory shortage is detected, the kernel 212 may notify the application terminator 214 to make more memory available by stopping one or more applications. In some circumstances, when the kernel 212 detects that memory is becoming scarce, the kernel 212 may notify the application terminator 214 to terminate one or more applications 216 near the bottom of the application hierarchy 224 to free enough memory to run other applications 216.

In some implementations, the operating system 205 may, after receiving a request from the user, restore a terminated application. For example, by minimizing or closing other application windows, or by selecting an icon that represents the dead application, the user may return to the application 216 that was stopped by the application terminator 214. When the operating system 205 receives an indication that the user has returned to the terminated application, the operating system 205 may recreate the application using the saved state information.

Figure 3:
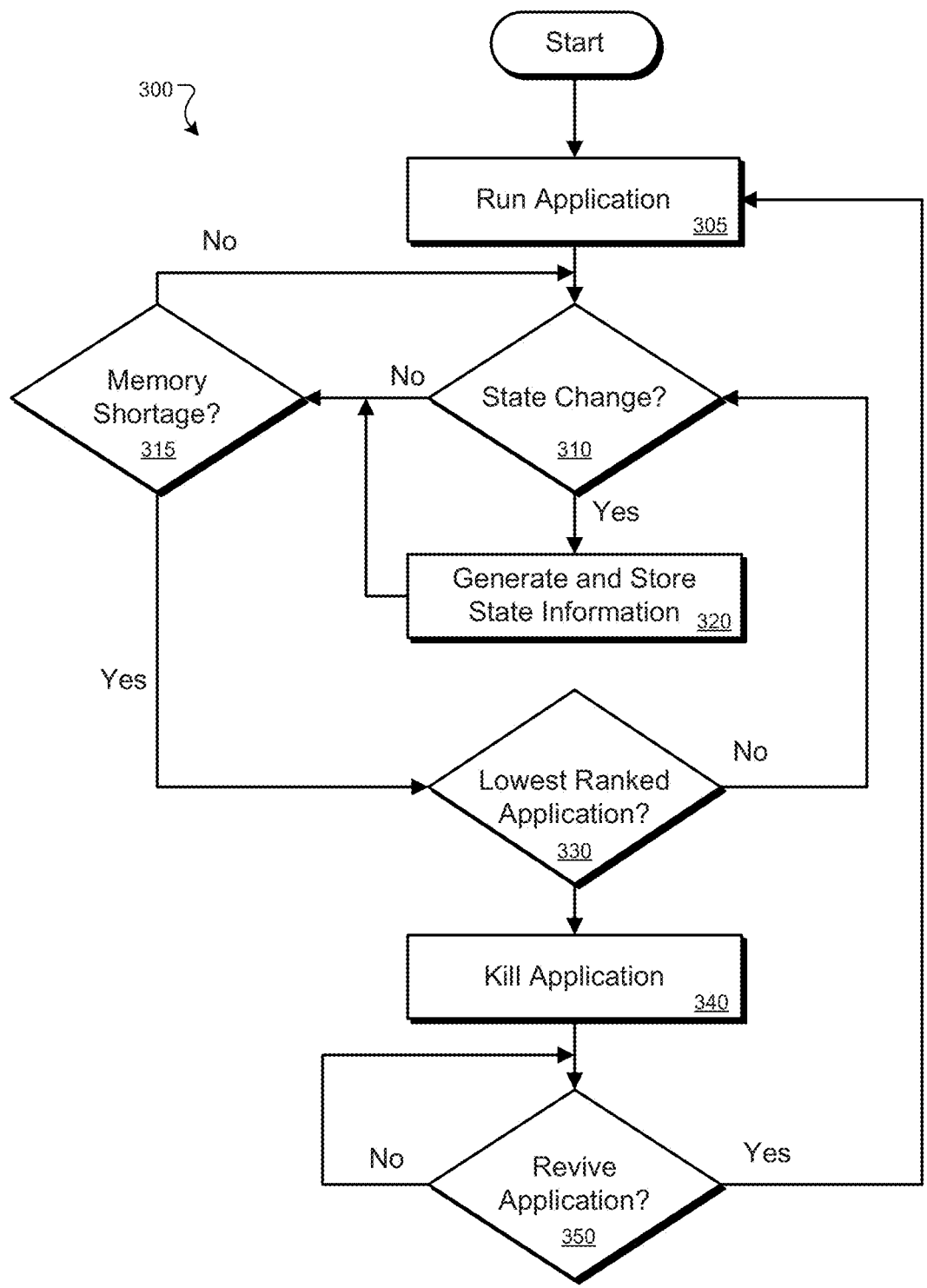
FIG. 3 is a flow chart of an example process for managing memory shortages on a computing device.

FIG. 3 is a flowchart of example process 300 for managing memory shortages on a computing device. The process 300 may be performed, for example, by a system such as the systems 100 and 200 and, for clarity of presentation, the description that follows uses the system 200 as the basis of an example for describing the process. However, another system, or combination of systems, may be used to perform the process 300.

Referring to FIG. 3, a process 300 illustrates the lifecycle of an application in the exemplary method for managing potential memory shortages on a computing device. The method begins at step 305, where an application is executed. For example, the operating system 205 may load an application from persistent memory 260 in response to a user request or at the behest of another application. Next, at step 310, the system 200 determines whether the state of the application has changed. In some implementations, the application monitor 220 can note when an application takes focus, when a new application has been created, or when application has been terminated. In an alternative embodiment, in addition to, or in lieu of, the changes mentioned above, the application manager 220 may monitor user inputs to the system (e.g., key presses, mouse clicks, stylus or finger taps, etc.) to determine when an application may have changed state.

If a change of state is not detected, the method proceeds to step 315, where the system determines whether a memory shortage exists. If the system determines that a memory shortage does exist, the method proceeds to step 330 discussed below. If, however, a memory shortage does not exist, step 310 is repeated.

Once a state change is detected, the method proceeds to step 320. At step 320, state information is generated and stored. Because applications in certain states may be killed at any time, after the application monitor 220 detects a state change, the application monitor 220 may instruct the application to generate and store state information in persistent memory 260. In an illustrative implementation, the state information may include information used to recreate the application as the application existed before it was terminated. For example, the state information may include, but is not limited to, the location of the application's window on the display, any changes to an application file made by the user, and the user's preferred view mode. Once the state information is generated, the application may store the state information to persistent memory 260.

After state information is generated and saved, the method proceeds to step 315 where the system determines whether a memory shortage exists. If the system determines that memory has run out, the kernel 212 may instruct the application terminator 214 to make memory available by killing one or more applications. In an alternative implementation, the kernel 212 may determine whether memory 260 is becoming scarce. The kernel 212 may detect an imminent memory shortage by comparing memory requests from the applications 216 with the memory currently available. The kernel 212 may also determine whether the amount of memory available is lower than a predetermined threshold value. When a shortage is detected, the kernel 212 may take steps to free enough memory to ensure that selected applications will have sufficient memory to continue normal operation.

If the system has determined that memory is needed, the method advances to step 330 where the application terminator 214 determines if the application is the lowest ranked application, i.e., whether the application is at the bottom of the application hierarchy 224. If the application is not at the bottom of hierarchy 224, the method returns to step 310 where the system monitors the application for a change of state. If the application is at the bottom of the hierarchy 224, the method proceeds to step 340, where the application is killed. In some implementations, the application terminator 214 determines whether the application is the last application in a program stack. If so, the application and any associated threads are killed.

At step 350, they system determines if the application should be revived. In an illustrative implementation, if the system detects a user attempt to return to an application that was killed, the method returns to step 305 where the application is revived using stored state information. For example, the system may detect attempts by the user to close or minimize windows overlaying the killed application. In response, the system 200 loads state information for the application from persistent memory 260 and uses the stored information to revive the application.

If the system 200 does not detect an attempt to interact with the killed application, the method returns to step 350 where the system 200 again determines whether to revive the application.

Figure 4:
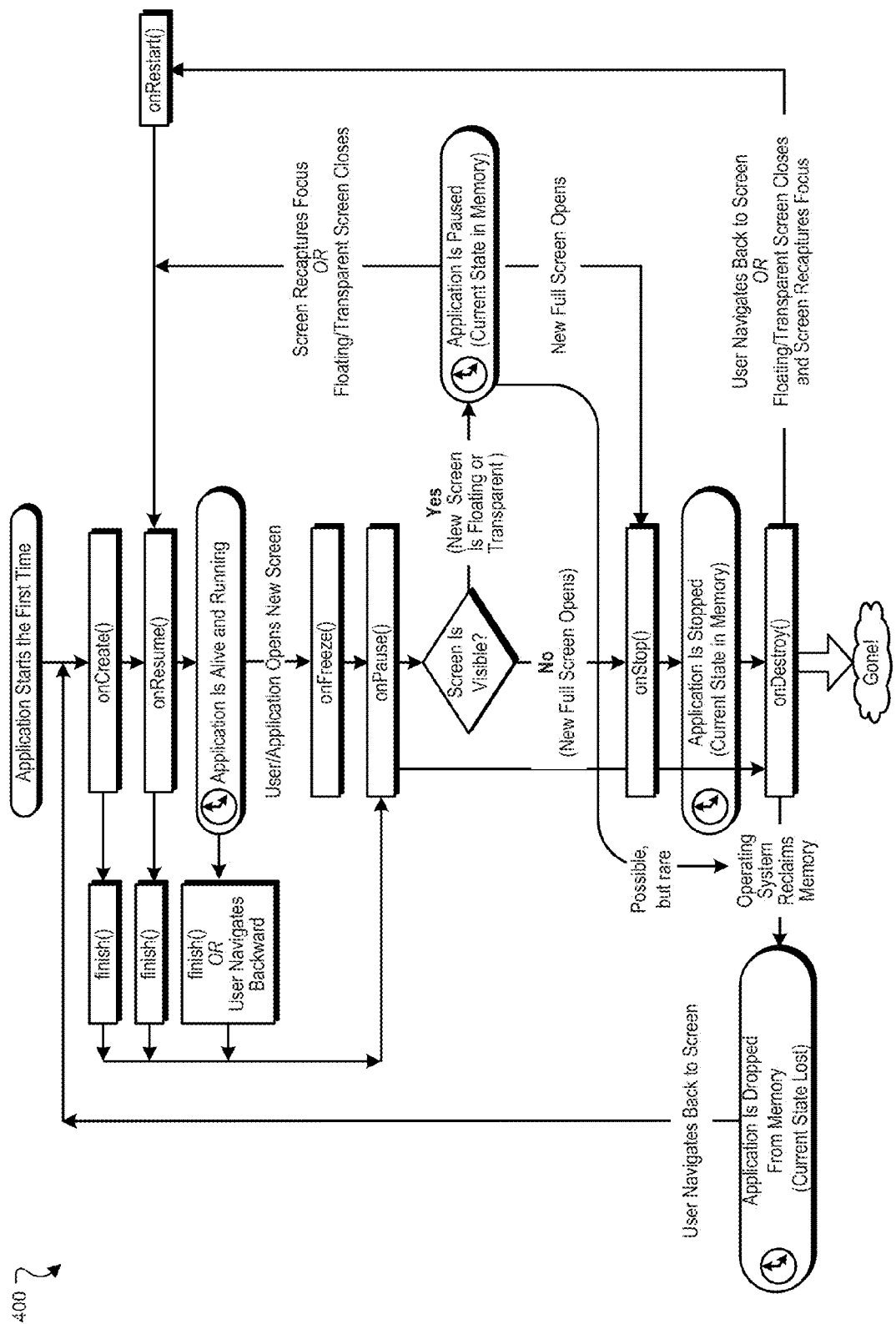
FIG. 4 shows a state diagram that illustrates in greater detail the lifecycle of applications in the exemplary system for managing memory shortages on a computing device.

FIG. 4 shows a state diagram 400 that illustrates in greater detail the lifecycle of applications in the exemplary system for managing memory shortages on a computing device. States are indicated in the diagram by ovals; an application stays in its present state until an event occurs. In one implementation, each application may have one of four states: active, paused, stopped, and dropped. An active application is an application that has focus; an application that has lost focus but is still visible is considered a paused application. Paused applications retain all state information associated with the application, e.g., user preferences or edits a user has made to a document, in application memory 218. Applications that are completely obscured by another window are stopped applications; like paused applications, stopped applications retain all state information in application memory 218. In some implementations, both paused and stopped applications may be erased by the operating system 205 at any time. Finally, dropped applications are applications that the operating system 205 has removed from memory 260.

Referring to FIG. 4, an application's lifecycle begins with its creation. As discussed in reference to FIG. 3 above, in certain implementations, applications may be created in response to either a user request or a command from another application. In an exemplary implementation, when an application is created the system may call the onCreate( ) function. In some implementations, onCreate( ) handles static setup operations such as binding data to lists and creating views. Some applications may not require (or permit) any interaction with the user during its execution; when these applications finish running, they are subsequently destroyed by the onDestroy( ) function.

If an application does require user interaction, in some implementations the system may call the onResume( ) function. In an illustrative example, onResume( ) is called before the application gains focus and prepares the application to interact with the user. For example, onResume( ) may start window animations or take control of devices (e.g., a camera or a microphone) for exclusive use by the application. Again, if the application finishes executing before another program takes focus away from the application, the application may be terminated by the onDestroy( ) function.

After the system calls onResume( ), the application switches to the active state and continues executing until the application finishes or the application window loses focus. An application window may lose focus if, for example, a user navigates away from the application window or a new application window is opened. In some implementations, if the application loses focus, the operating system may subsequently call the onFreeze( ) and onPause( ) functions. onFreeze( ), in some circumstances, may generate and save state information for the application to application memory 218. The system may call onPause( ) immediately after onFreeze( ) to save the state information generated by onFreeze( ) to persistent memory 260.

In an illustrative example, after saving its state information to persistent memory 260, the state of the application may change depending on the visibility of the application's window. In some implementations, if the application window is still visible after losing focus (e.g., the new window is transparent or a floating window) the active application may change to a paused application. In some circumstances, the paused application may be erased by the operating system; this procedure is discussed further in the description of the stopped state. If the paused application regains focus (by, for example, the new screen being closed), the paused application changes state back to an active application. If, however, a new full screen application window opens, the paused application shifts to the stopped state, which is discussed in further detail below.

In some implementations, if the new application's window occupies the entire screen, the operating system calls the onStop( ) function. In an illustrative implementation, onStop( ) saves the application's state information to persistent memory 260 and the paused application changes state to a stopped application. In the illustrative implementation, when an application in the stopped state regains focus, the system may call the onRestart( ) function. onRestart( ) may requery a cursor before the application changes back to the active state.

As noted above, applications in the stopped or paused state may be terminated by the operating system at any time. When an application is killed, the application becomes a dropped application and any associated application memory 218 is erased and made available to other applications.

Since dropped applications have no state information in application memory, they must be recreated from state information saved in persistent memory 260. In the exemplary implementation, when user returns to a dropped application, the system calls onCreate( ) to recreate the dropped application. Using the state information saved to persistent memory 260, onCreate( ) revives the application and the state transition process described above is repeated.

Figure 5:
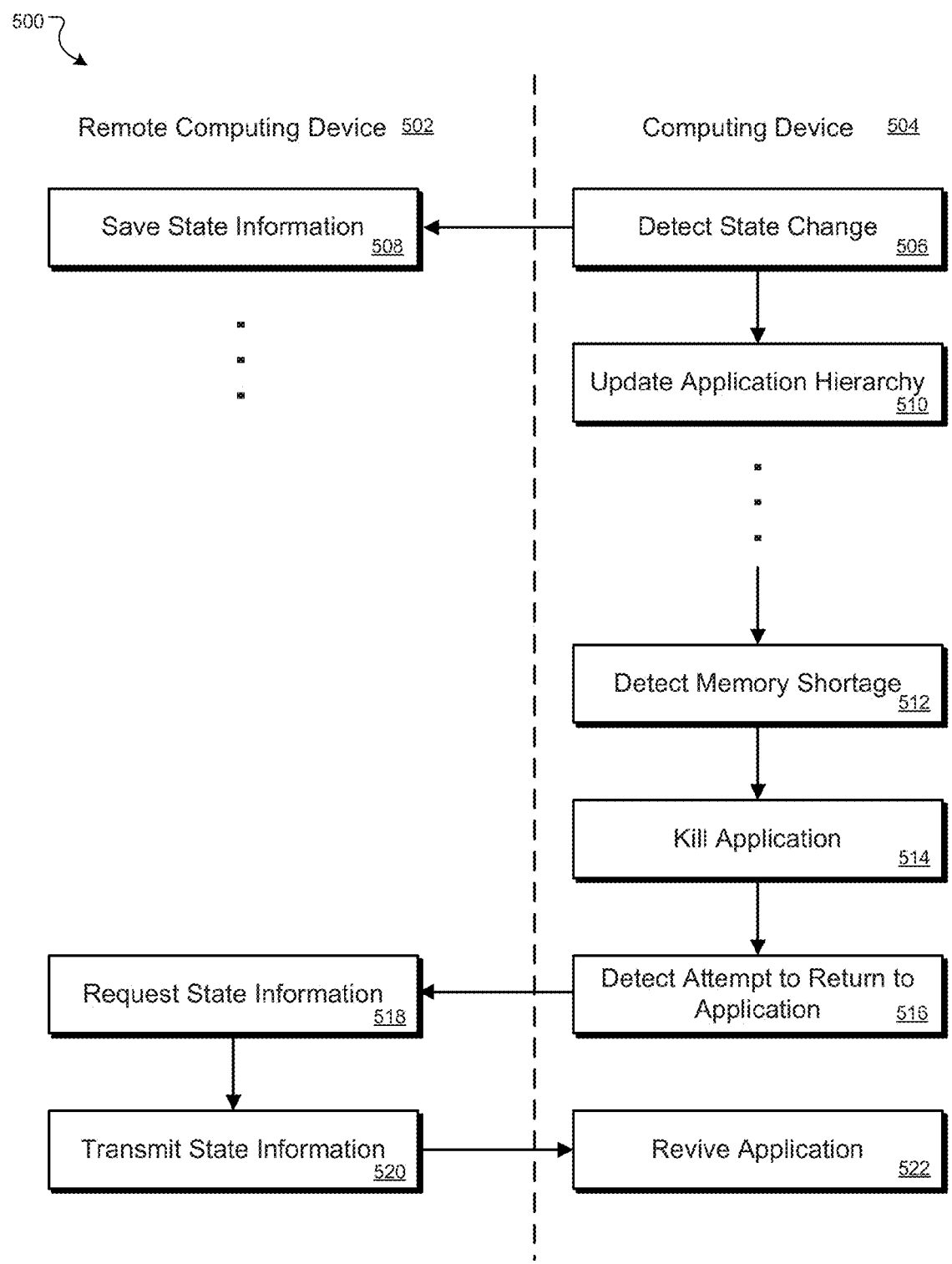
FIG. 5 illustrates an exemplary method of operation of a memory management system in a client-server environment.

FIG. 5 illustrates an exemplary method 500 of operation of a memory management system in a client-server environment. The process 500 may be performed, for example, by a system such as the systems 100 and 200; the description that follows uses the system 200 as the basis of an example for describing the process. However, another system, or combination of systems, may be used to perform the process 500.

At step 506, an operating system 205 detects a state change in a graphical user interface. In some circumstances, an application monitor 220 may monitor the graphical user interface and note when a new application comes into the foreground of the user interface. In response to the state change, at step 508 the operating system 205 instructs the applications 216 to generate and save state information. Instead of saving the state information to memory on the device 504, applications may transmit the state information to a remote computing device 502. In an illustrative example, the remote computing device can be a web server 502. In alternative implementations, the remote computing device may a mobile device (e.g., cellular telephone, PDA, or laptop) or a personal computer.

After detecting a state change and saving state information, the system 200 updates an application hierarchy 224 at step 510. In some circumstances, the applications 216 can be ranked in the hierarchy 224 according to when each application 216 was in focus. In alternative implementations, applications may be ranked according to other criteria, such as memory or processor usage. This process—detecting a state change 506, saving state information to a remote device 508, and updating an application hierarchy 510—is repeated until memory on the computing device 504 is exhausted. If, at step 512, the operating system 205 detects a memory shortage, the operating system 205 may kill one or more applications 216 at step 514.

In some situations, the operating system 205 may kill applications 216 at the bottom of the application hierarchy 224. In an alternative implementation, the system may notify the user of the memory shortage and allow the user to select an application to terminate. Subsequently, at step 516 when the system detects an attempt by the user to return to the killed application at step 514, the application may request state information from the computing device at step 518. At step 520, the remote computing device 502 may transmit state information to the computing device 504. After receiving the state information transmitted at step 520, the computing device 504 may revive the suspended application at step 522.

Figure 6:
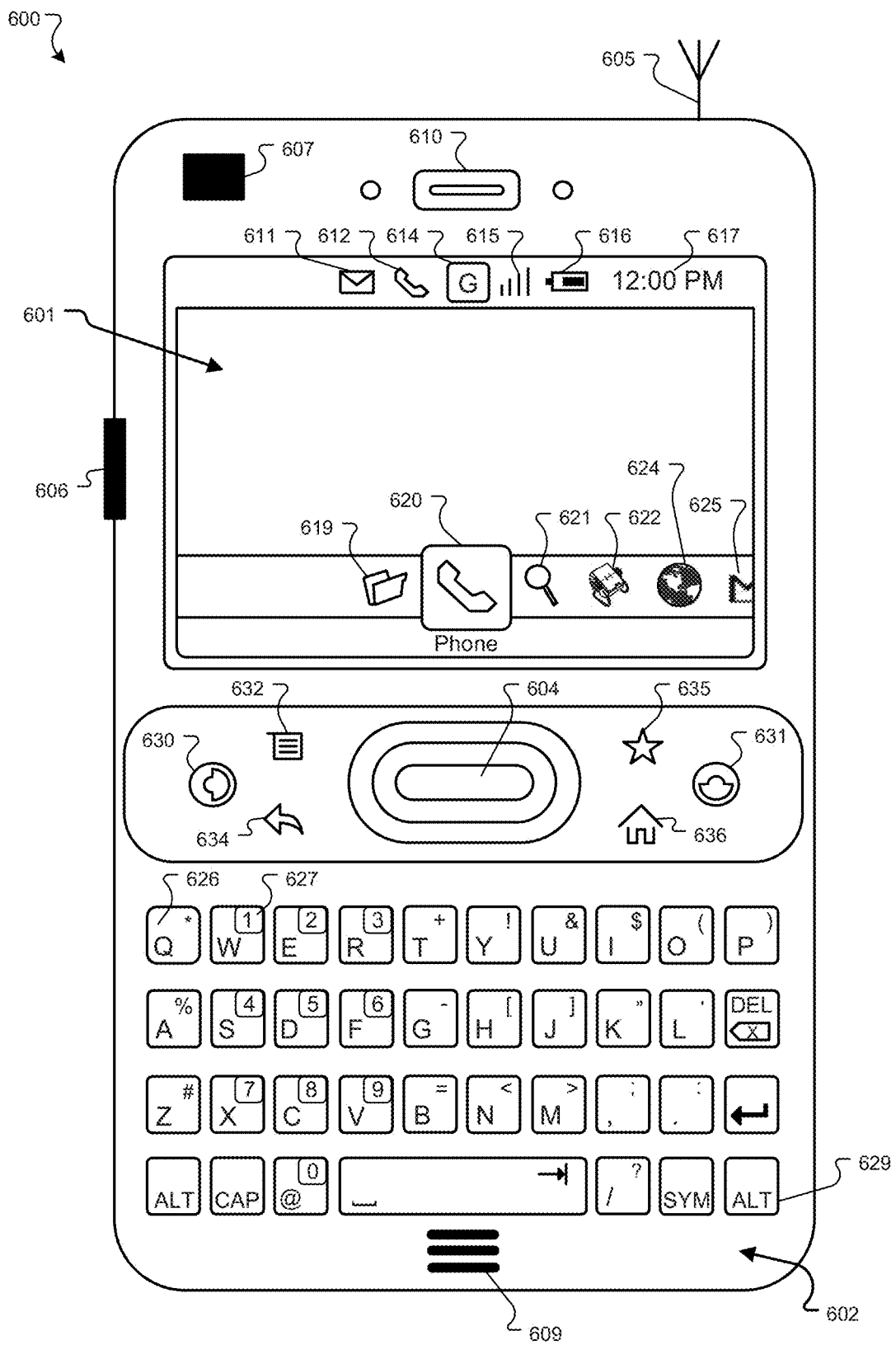
FIG. 6 illustrates the exterior appearance of an exemplary device that implements various aspects of an exemplary system for managing memory shortages on a computing device.

Referring now to FIG. 6, the exterior appearance of an exemplary device 600 that implements various aspects of an application manager is illustrated. Briefly, and among other things, the device 600 includes a processor configured to connect to an application management system and perform various functions, some of which have been described above in relation to managing applications running on the device 600, upon request of a user of the mobile device.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610. Although the device 600 shows an external antenna, the device 600 can include an internal antenna 605, which is not visible to the user.

The display 601 can display video, graphics, images, and text that make up the user interface for the software applications used by the device 600, and the operating system programs used to operate the device 600. Among the possible elements that may be displayed on the display 601 are a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, a mapping application icon 624, an email application icon 625, or other application icons. In one example implementation, the display 601 is a quarter video graphics array (QVGA) thin film transistor (TFT) liquid crystal display (LCD), capable of 16-bit or better color.

A user uses the keyboard (or "keypad") 602 to enter commands and data to operate and control the operating system and applications that provide for displaying, configuring, and viewing various applications. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish call key 630 that causes a received call to be answered or a new call to be originated; a terminate call key 631 that causes the termination of an active call; a drop down menu key 632 that causes a menu to appear within the display 601; a backward navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), 6GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM7200A chipset with an QUALCOMM® RTR6285™ transceiver and PM7540™ power management circuit.

The wireless or wired computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wired or wireless connector. Example wireless connectors include, for example, an INFRARED DATA ASSOCIATION® (IrDA®) wireless connector, a Wi-Fi wireless connector, an optical wireless connector, an INSTITUTE OF ELECTRICAL AND ELECTRONICS ENGINEERS® (IEEE®) Standard 802.11 wireless connector, a BLUETOOTH® wireless connector (such as a BLUETOOTH® version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE®-1394 FIREWIRE® connector, a Universal Serial Bus (USB) connector (including a mini-B USB interface connector), a serial port connector, a parallel port connector, or other wired connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 6 mega-pixel (MP) camera that utilizes a complementary metal-oxide semiconductor (CMOS).

The microphone 609 allows the device 600 to capture sound, and may be an omni-directional microphone, a unidirectional microphone, a bi-directional microphone, a shotgun microphone, or other type of apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such as a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
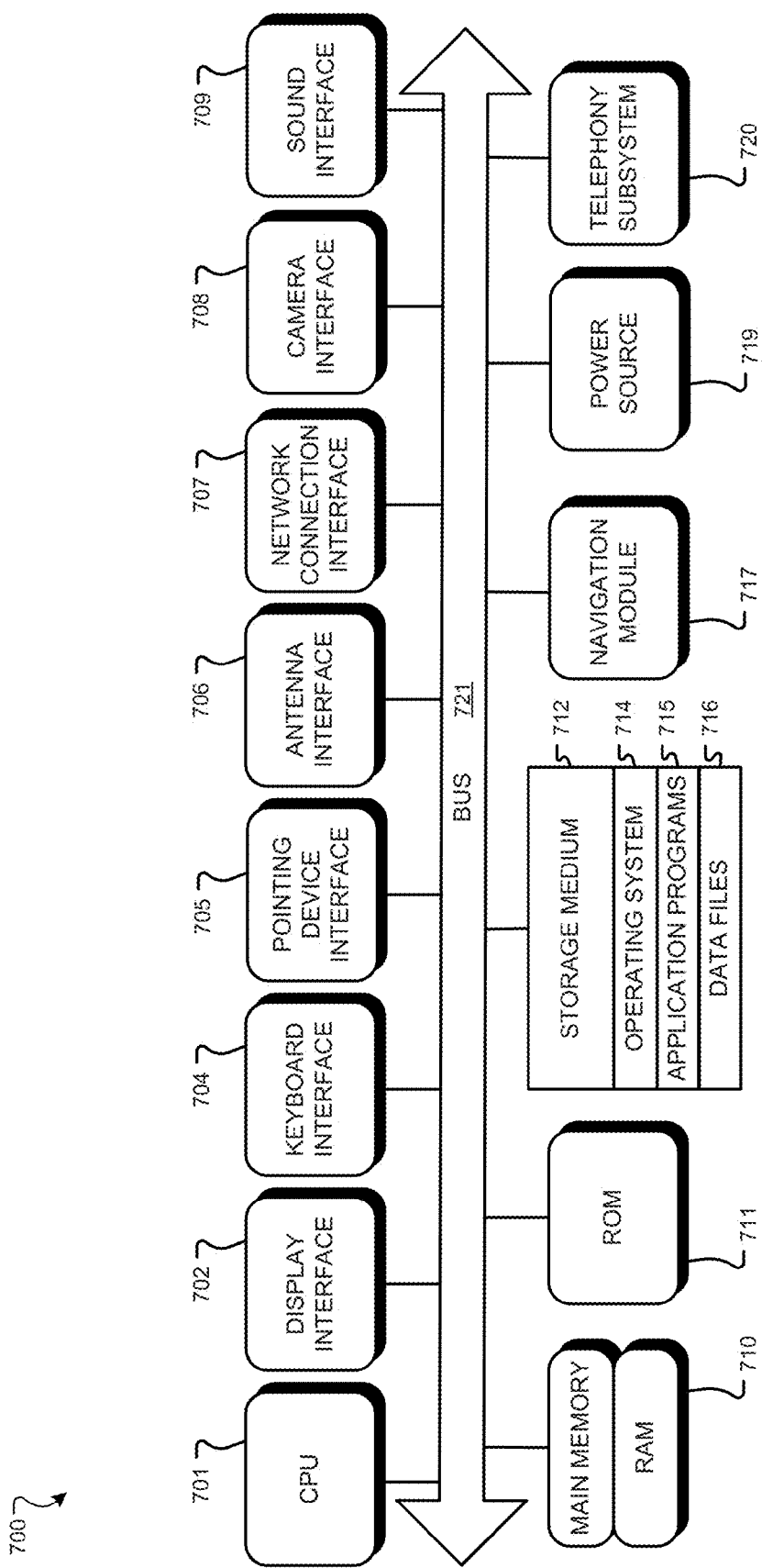
FIG. 7 is a block diagram illustrating an internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 708 that provides a communication interface and processing functions for capturing digital images from the camera 607; a sound interface 709 that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 714, application programs 715 (including, for example, a web browser application, a widget or gadget engine, and or other applications, as necessary) and data files 716 are stored; a navigation module 717 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 can be one of a number of computer processors. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to store image data in the mobile device. In some embodiments, the computer program product includes instructions that allow a user to fully implement and use various applications simultaneously. In some embodiments, the computer program product includes functionality for accepting amendments to the software, for example, updating the computer program product to correct "bugs" or glitches in the software or hardware operations. In some embodiments, the updating can include adding additional elements and features to the computer program product that improve its utility.

The operating system 713 may be a LINUX®-based operating system such as the GOOGLE® mobile device platform; APPLE® MAC OS X®; MICROSOFT® WINDOWS NT®/WINDOWS® 2000/WINDOWS® XP/WINDOWS MOBILE; a variety of UNIX®-flavored operating systems; or a proprietary operating system for computers or embedded systems. The application development platform or framework for the operating system 714 may be: BINARY RUNTIME ENVIRONMENT FOR WIRELESS® (BREW®); JAVA® Platform, Micro Edition (JAVA® ME) or JAVA® 2 Platform, Micro Edition (J2ME®) using the SUN MICROSYSTEMS® JAVASCRIPT® programming language; PYTHON™, FLASH LITE®, or MICROSOFT® .NET Compact, or another appropriate environment.

The device stores computer-executable code for the operating system 714, and the application programs 715 such as an email, instant messaging, a video service application, a mapping application word processing, spreadsheet, presentation, gaming, mapping, web browsing, JAVASCRIPT® engine, or other applications. For example, one implementation may allow a user to access the GOOGLE® GMAIL® email application, the GOOGLE® TALK® instant messaging application, a YOUTUBE® video service application, a GOOGLE® MAPS® or GOOGLE® EARTH® mapping application, or a GOOGLE® PICASA® imaging editing and presentation application. The application programs 715 may also include a widget or gadget engine, such as a TAFRI™ widget engine, a MICROSOFT® gadget engine such as the WINDOWS SIDEBAR® gadget engine or the KAPSULES™ gadget engine, a YAHOO!® widget engine such as the KONFABULTOR™ widget engine, the APPLE® DASHBOARD® widget engine, the GOOGLE® gadget engine, the KLIPFOLIO® widget engine, an OPERA™ widget engine, the WIDGETS™ widget engine, a proprietary widget or gadget engine, or other widget or gadget engine the provides host system software for a physically-inspired applet on a desktop.

Although it is possible to provide for implementing a application manager using the above-described implementation, it is also possible to implement the functions according to the present disclosure as a dynamic link library (DLL), or as a plug-in to other application programs such as an Internet web-browser such as the FOXFIRE web browser, the APPLE® SAFARI® web browser or the MICROSOFT® INTERNET EXPLORER® web browser.

The navigation module 717 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 717 may also be used to measure angular displacement, orientation, or velocity of the device 600, such as by using one or more accelerometers.

Figure 8:
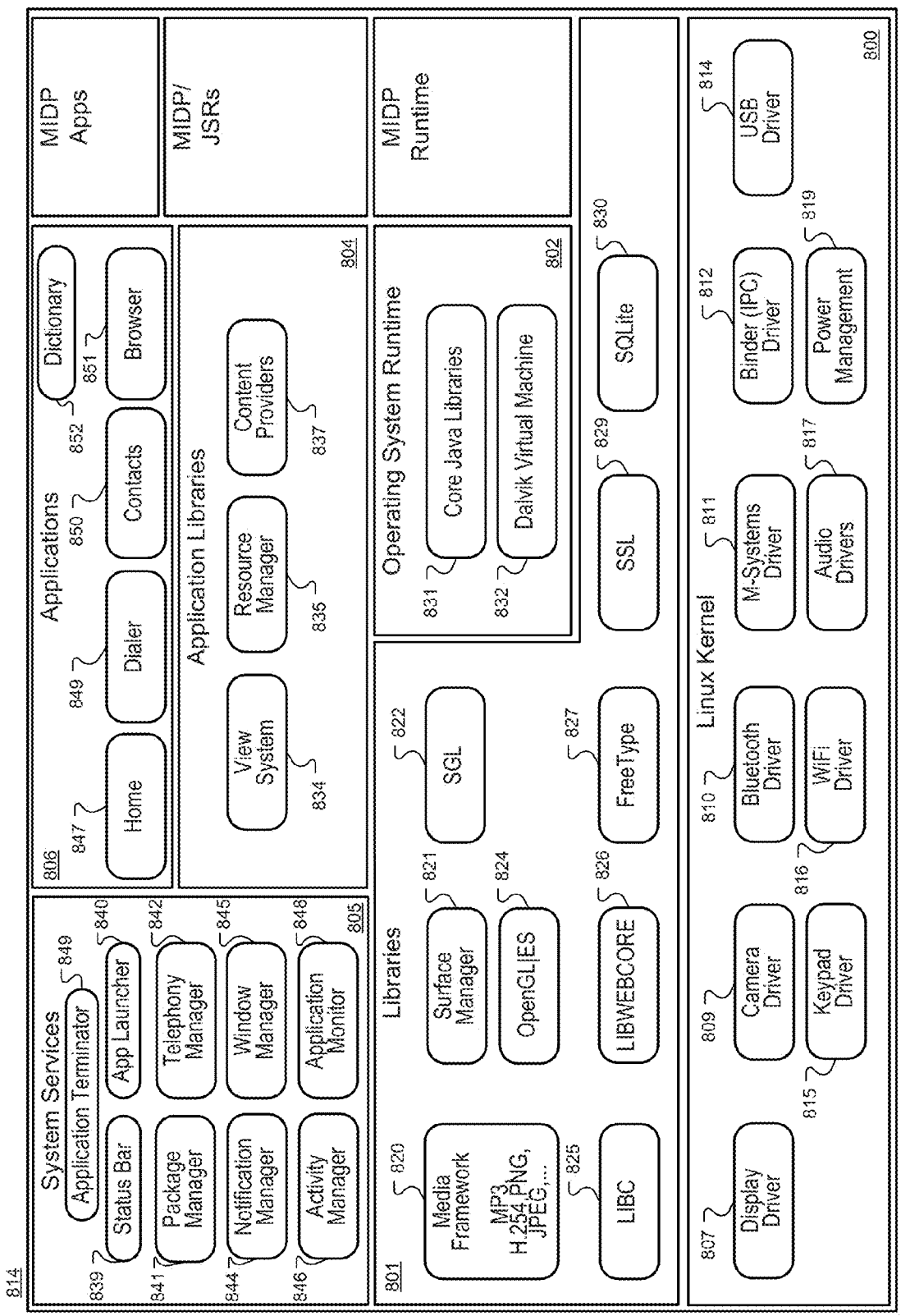
FIG. 8 is a block diagram illustrating exemplary components of the operating system used by the device, in the case where the operating system is the GOOGLE mobile device platform

FIG. 8 is a block diagram illustrating exemplary components of the operating system 814 used by the device 800, in the case where the operating system 814 is the GOOGLE® mobile device platform. The operating system 814 invokes multiple processes, while ensuring that the associated phone application is responsive, and that wayward applications do not cause a fault (or "crash") of the operating system. Using task switching, the operating system 814 allows for the switching of applications while on a telephone call, without losing the state of each associated application. The operating system 814 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 814 can generally be organized into six components: a kernel 800, libraries 801, an operating system runtime 802, application libraries 804, system services 805, and applications 806. The kernel 800 includes a display driver 807 that allows software such as the operating system 814 and the application programs 815 to interact with the display 601 via the display interface 702, a camera driver 809 that allows the software to interact with the camera 607; a BLUETOOTH® driver 810; a M-Systems driver 811; a binder (IPC) driver 812, a USB driver 814 a keypad driver 815 that allows the software to interact with the keyboard 602 via the keyboard interface 704; a WiFi driver 816; audio drivers 817 that allow the software to interact with the microphone 609 and the speaker 610 via the sound interface 709; and a power management component 819 that allows the software to interact with and manage the power source 819.

The BLUETOOTH® driver, which in one implementation is based on the BlueZ BLUETOOTH® stack for LINUX®-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH® driver provides JAVA® bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joing Photographic Experts Group (JPEG), and others) using an efficient JAVA® Application Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802, which generally makes up a Mobile Information Device Profile (MIDP) runtime, includes core JAVA libraries 831, and a Dalvik virtual machine 832. The Dalvik virtual machine 832 is a custom, JAVA-compatible virtual machine that runs a customized file format (.DEX) as well as unmodified JAVA files (.CLASS/.JAR). With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 804, which generally make up the MIDP JAVA® Specification Requests (JSRs), includes a view system 834, a resource manager 835, and content providers 837. The system services 805 includes a status bar 839; an application launcher 840; a package manager 841 that maintains information for all installed applications; a telephony manager 842 that provides an application level JAVA® interface to the telephony subsystem 720; a notification manager 844 that allows all applications access to the status bar and on-screen notifications; a window manager 845 that allows multiple applications with multiple windows to share the display 601; an activity manager 846 that runs each application in a separate process, manages an application life cycle, and maintains a cross-application history; an application monitor 848 to monitor state changes in the applications; and an application terminator 849 to terminate one or more applications.

The applications 806, which generally make up the MIDP applications, include a home application 847, a dialer application 849, a contacts application 850, a browser application 851, and a dictionary application 852.

The telephony manager 842 provides event notifications (such as phone state, network state, Subscriber Identity Module (SIM) status, or voicemail status), allows access to state information (such as network information, SIM information, or voicemail presence), initiates calls, and queries and controls the call state. The browser application 851 renders web pages in a full, desktop-like manager, including navigation functions. Furthermore, the browser application 851 allows single column, small screen rendering, and provides for the embedding of HTML views into other applications.

Figure 9:
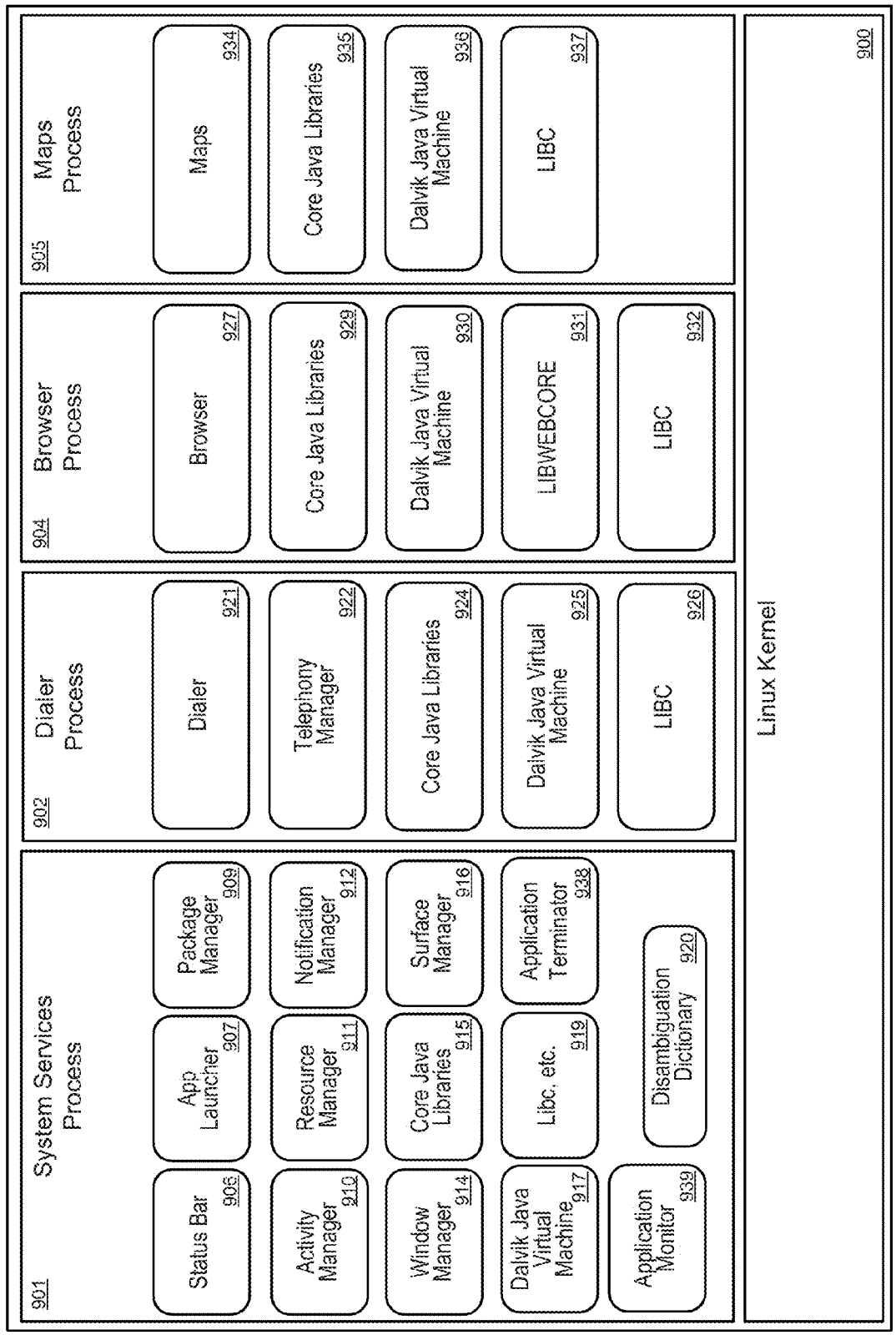
FIG. 9 is a block diagram illustrating exemplary processes implemented by the operating system kernel.

FIG. 9 is a block diagram illustrating exemplary processes implemented by the operating system kernel 900. Generally, applications and system services run in separate processes, where the activity manager 846 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

The persistent core system services, such as the surface manager 916, the window manager 914, or the activity manager 910, are hosted by system processes, although application processes, such processes associated with the dialer application 921, may also be persistent. The processes implemented by the operating system kernel 900 may generally be categorized as system services processes 901, dialer processes 902, browser processes 904, and maps processes 905. The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with a resource manager (not shown) that provides access to graphics, localized strings, and XML layout descriptions; notification manager processes 912 associated with the notification manager 844; window manager processes 914 associated with the window manager 845; core JAVA® libraries processes 915 associated with the core JAVA® libraries 831; surface manager processes 916 associated with the surface manager 821; Dalvik JAVA® virtual machine processes 917 associated with the Dalvik virtual machine 832, LIBC processes 919 associated with the LIBC library 825; application terminator processes 938 associated with the application terminator 849; and application monitor processes 939 associated with the application monitor 848.

The dialer processes 902 include dialer application processes 921 associated with the dialer application 849; telephony manager processes 922 associated with the telephony manager 842; core JAVA® libraries processes 924 associated with the core JAVA® libraries 831; Dalvik JAVA® virtual machine processes 925 associated with the Dalvik Virtual machine 832; and LIBC processes 926 associated with the LIBC library 825. The browser processes 904 include browser application processes 927 associated with the browser application 851; core JAVA® libraries processes 929 associated with the core JAVA® libraries 831; Dalvik JAVA® virtual machine processes 930 associated with the Dalvik virtual machine 832; LIBWEBCORE processes 931 associated with the LIBWEBCORE library 826; and LIBC processes 932 associated with the LIBC library 825.

The maps processes 905 include maps application processes 934, core JAVA® libraries processes 935, Dalvik JAVA® virtual machine processes 936, and LIBC processes 937. Notably, some processes, such as the Dalvik JAVA® virtual machine processes, may exist within one or more of the systems services processes 901, the dialer processes 902, the browser processes 904, and the maps processes 905.

Figure 10:
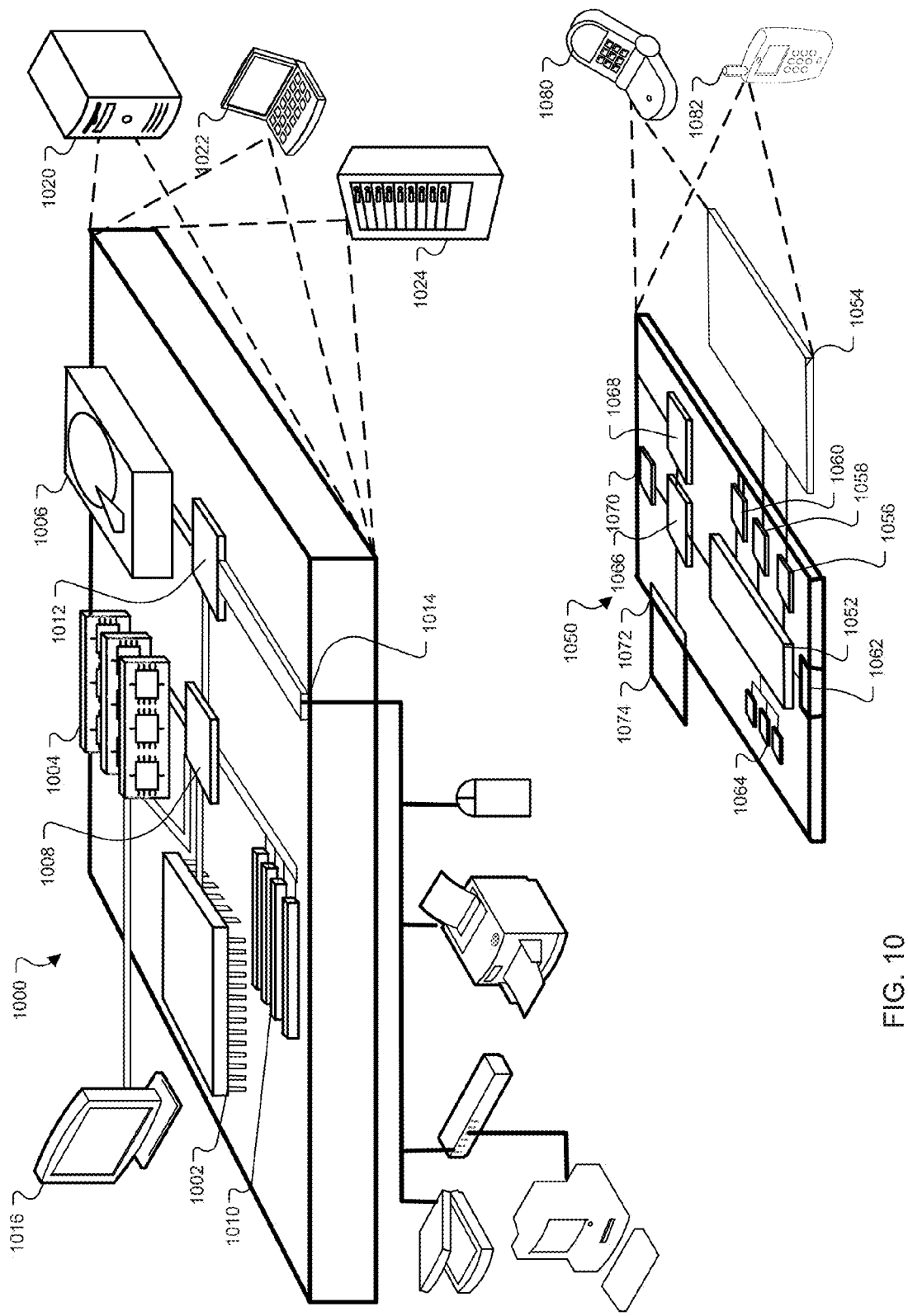
FIG. 10 shows an example of a generic computer device and a generic mobile computer device, which may be used with the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. For example, while the above disclosure uses the term "telephony," it is implied that other forms of communication that don't necessarily use telephones, such as voice-over-IP systems are considered equivalent with regard to the ability to connect one person to another over transmission lines or wirelessly. Accordingly, other embodiments are within the scope of the following claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   executing, by a computing system, multiple computer application programs;
   identifying, by the computing system, that a memory condition is present;
   determining, by the computing system, to terminate a particular application program in order to alleviate the memory condition, the particular application program being one of the multiple computer application programs that are executing;
   copying, by the computing system, a display by the particular application program that the computing system determined to terminate;
   terminating, by the computing system, the particular application program in response to having determined to terminate the particular application program;
   displaying, by the computing system, the copy of the display by the particular application program after the particular application program has been terminated; and
   reviving, by the computing system, the particular application program after the particular application program has been terminated and the copy of the display by the particular application program has been displayed.

2. The computer-implemented method of claim 1, wherein identifying that the memory condition is present includes detecting a pending memory shortage of the computing system.

3. The computer-implemented method of claim 1, wherein terminating the particular application program involves erasing the particular application program from a memory of the computing system.

4. The computer-implemented method of claim 1, wherein the computing system displays the copy of the display by the particular application program in a manner to prevent a user of the computing system from realizing that the particular application program has been terminated.

5. The computer-implemented method of claim 1, further comprising:
   saving, by the computing system, state information for the particular application program before terminating the particular application program; and
   using, by the computing system, the saved state information in the reviving of the particular application program.

6. The computer-implemented method of claim 1, wherein reviving the particular application program includes presenting the particular application program as the particular application program existed before the particular application program was terminated.

7. The computer-implemented method of claim 1, further comprising detecting a user attempt to interact with or return to the particular application program after the particular application program has been terminated, and in response performing the reviving of the particular application program.

8. The computer-implemented method of claim 7, wherein the detected user attempt to interact with or return to the particular application program involves user selection of an icon that represents the particular application program.

9. The computer-implemented method of claim 1, wherein the display by the particular application program is a display of an application window for the particular application program.

10. A computer-implemented method, comprising:
    executing, by a computing system, multiple computer application programs;
    detecting, by the computing system, a pending memory shortage of the computing system;
    determining, by the computing system, to terminate a particular application program in order to alleviate the pending memory shortage, the particular application program being one of the multiple computer application programs that are executing;
    saving, by the computing system, state information for the particular application program;
    copying, by the computing system, a display by the particular application program;
    terminating, by the computing system and in response to having determined to terminate the particular application program and having saved the state information for the particular application program, the particular application program in order to erase the particular application program from a memory of the computing system;
    displaying, by the computing system, the copy of the display by the particular application program after the particular application program has been terminated;
    detecting, by the computing system, a user attempt to interact with or return to the particular application program while the particular application program is terminated and the copy of the display by the particular application program is being displayed; and
    using, by the computing system and as a result of having detected the user attempt to interact with or return to the particular application program, the saved state information to revive the particular application program so that the particular application program is presented as the particular application program existed before the particular application program was terminated.

11. A non-transitory computer-readable medium including instructions that, when executed by a processor, cause performance of operations that include:
    executing, by a computing system, multiple computer application programs;
    identifying, by the computing system, that a memory condition is present;
    determining, by the computing system, to terminate a particular application program in order to alleviate the memory condition, the particular application program being one of the multiple computer application programs that are executing;
    copying, by the computing system, a display by the particular application program that the computing system determined to terminate;
    terminating, by the computing system, the particular application program in response to having determined to terminate the particular application program;
    displaying, by the computing system, the copy of the display by the particular application program after the particular application program has been terminated; and
    reviving, by the computing system, the particular application program after the particular application program has been terminated and the copy of the display by the particular application program has been displayed.

12. The computer-readable medium of claim 11, wherein identifying that the memory condition is present includes detecting a pending memory shortage of the computing system.

13. The computer-readable medium of claim 11, wherein terminating the particular application program involves erasing the particular application program from a memory of the computing system.

14. The computer-readable medium of claim 11, wherein the computing system displays the copy of the display by the particular application program in a manner to prevent a user of the computing system from realizing that the particular application program has been terminated.

15. The computer-readable medium of claim 11, wherein the operations further comprise:
   saving, by the computing system, state information for the particular application program before terminating the particular application program; and
   using, by the computing system, the saved state information in the reviving of the particular application program.

16. The computer-readable medium of claim 11, wherein reviving the particular application program includes presenting the particular application program as the particular application program existed before the particular application program was terminated.

17. The computer-readable medium of claim 11, wherein the operations further comprise detecting a user attempt to interact with or return to the particular application program after the particular application program has been terminated, and in response performing the reviving of the particular application program.

18. The computer-readable medium of claim 17, wherein the detected user attempt to interact with or return to the particular application program involves user selection of an icon that represents the particular application program.

19. The computer-readable medium of claim 11, wherein the display by the particular application program is a display of an application window for the particular application program.

* * * * *